United States Patent [19]

Takasuna et al.

[11] Patent Number: 4,844,963
[45] Date of Patent: Jul. 4, 1989

[54] MAGNETIC DISK AND METHOD OF MANUFACTURING SAME

[75] Inventors: Eiichi Takasuna; Masaaki Imamura, both of Odawara, Japan

[73] Assignee: 501 Hitachi, Ltd., Tokyo, Japan

[21] Appl. No.: 150,612

[22] Filed: Feb. 1, 1988

[30] Foreign Application Priority Data

Mar. 5, 1987 [JP] Japan ................................. 62-48888

[51] Int. Cl.⁴ ............................................... G11B 5/70
[52] U.S. Cl. ...................................... 428/64; 427/131; 427/340; 427/379; 428/323; 428/694; 428/900
[58] Field of Search ................ 428/694, 900, 141, 64, 428/323; 427/128, 131, 340, 385.5, 379

[56] References Cited

U.S. PATENT DOCUMENTS

| | | | |
|---|---|---|---|
| 4,275,113 | 6/1981 | Saito et al. | 427/131 |
| 4,619,856 | 10/1986 | Kamada et al. | 427/131 |
| 4,664,964 | 5/1987 | Okita et al. | 427/131 |
| 4,666,769 | 5/1987 | Miyata et al. | 427/131 |

*Primary Examiner*—Paul J. Thibodeau
*Attorney, Agent, or Firm*—Kenyon & Kenyon

[57] ABSTRACT

Fillers are mixed into a resin solution used to form a resin layer on the substrate of a magnetic disk. Therefore, the distance from the boundary between the resin layer and magnetic film to the filler top as well as the distance from the surface of the magnetic film to the top of the filler in the magnetic film are freely adjustable by appropriately setting the particle size of mixed fillers, thickness of the resin layer and thickness of magnetic film independently or in combination. Thus, the magnetic disk can be designed with a considerably improved freedom.

36 Claims, 3 Drawing Sheets

MAGNETIC DISK AND METHOD OF MANUFACTURING SAME

BACKGROUND OF THE INVENTION (a) Field of the Invention

The present invention relates to a magnetic disk and method of manufacturing the magnetic disk, and more particularly to a magnetic disk suitable for optimization of the floating posture of the magnetic head and in which the electromagnetic conversion characteristic and the signal-to-noise ratio of reproduced signal are improved through the improvement in strength of the magnetic film on the magnetic disk.

(b) Related Art Statement

As shown in FIG. 1, a conventional magnetic disk is known which has a substrate 1 on which there is formed a resin layer 2 on which there is formed a magnetic film 3 on which a lubricant layer 7 is applied. The magnetic film 3 is composed of a magnetic powder 4, fillers 5 and a binder 6 as shown. Normally, a magnetic iron oxide is used to produce the magnetic powder and a single-crystal alumina is used to produce the fillers 5. Also the binder 6 is usually made of a thermosetting resin.

The mixing of the fillers 5 in the magnetic film 3 in the above-mentioned conventional magnetic disk is intended to increase the strength of the magnetic film 3 and improve the durability of the magnetic film 3. From another point of view, however, the mixing of the fillers 5 in the magnetic film 3 will possibly cause a defect in the magnetic film 3. Thus the fillers 5 will possibly introduce noise to the reproduced signal, degrade the signal-to-noise ratio of the reproduced signal and degrade the electromagnetic conversion characteristic of the magnetic disk. Especially in case a filler 5 protrudes from the surface of the magnetic film 3 as shown in FIG. 1, the problem due to the above-mentioned fillers 5 will be remarkably difficult.

Also in case a magnetic disk is produced of which the thickness of the magnetic film 3 is reduced to increase the recording density, a filler 5 will protrude high from the surface of the magnetic film 3 as shown in FIG. 2. This is because the uniform reduction in particle size of many fillers 5 is technically limited and the particle size of the fillers 5 is large as compared with the thickness of the magnetic film 3. Therefore, with the conventional technique, it is difficult to produce a magnetic disk of which the magnetic film 3 is reduced in thickness. Also if the filler 5 protrudes high from the magnetic film 3, the filler 5 will introduce noise to the reproduced signal, lower the signal-to-noise ratio of the reproduced signal and degrade the electromagnetic conversion characteristic of the magnetic disk. In addition, if the filler 5 is protruded high from the magnetic film 3, the magnetic head will collide with the filler 5 when recording and/or reproduction is made to and from the magnetic disk and adversely affect the floating posture of the magnetic head. As a result, the electromagnetic conversion characteristic of the magnetic disk is further degraded.

To solve the above-mentioned problems, it is necessary to limit the height of the filler 5 to a predetermined value with reference to the surface of the resin layer 2 and, for example, to manufacture a magnetic disk for the filler 5 not to protrude too much from the surface of the magnetic film 3. With the conventional method of producing a magnetic disk, however, it is very difficult to control the protruded height of the filler from the surface of the magnetic film 3 and the height of the filler from the resin layer 2 in the magnetic film 3. The above-mentioned problem has become remarkably difficult as an increasingly reduced thickness of the magnetic film 3 is required for the magnetic disks.

As a conventional technique related with the present invention, an invention is known from the Japanese Unexamined Patent Publication (Kokai) No. 61-29414 in which a magnetic disk is disclosed in which fine particles are diffused in a plated layer formed on a substrate and a magnetic film is formed on the plated layer. However, the formation of the plated layer in which fine particles are contained is intended for reducing the manufacturing costs by thinning the plated layer through reinforcement of the plated layer itself, and for protecting the magnetic film by laying some of the fine particles as exposed on the surface of the magnetic film.

On the contrary, the present invention proposes a magnetic disk in which the resin layer 2 is formed, not the plated layer, on the substrate, and a method of manufacturing such magnetic disks, in which the protruded height of the filler can be easily controlled. Therefore, the present invention is basically different from the invention disclosed in the above-mentioned Japanese Unexamined Patent Publication.

SUMMARY OF THE INVENTION

The present invention has a primary object to provide a magnetic disk manufacturing method in which the distance from the boundary between the resin layer and magnetic film to the filler top and the distance from the surface of the magnetic film to the top of the filler in the magnetic film can be freely adjusted, and a magnetic disk manufactured by this method.

The present invention has another object to provide a magnetic disk manufacturing method in which the distance from the surface of the magnetic film to the top of the protruding filler can be freely adjusted, and a magnetic disk manufactured by this method.

According to the present invention, fillers are mixed in a resin solution used for forming the resin layer. Therefore, appropriate setting of the particle size of the mixed fillers, thickness of the resin layer and the thickness of the magnetic film independently or in combination permits to freely adjust the distance from the boundary between the resin layer and magnetic film to the top of the filler in the magnetic film and the distance from the surface of the magnetic film to the top of a protruding filler.

These and other objects and advantages of the present invention will be better understood from the ensuing description made, by way of example, of the preferred embodiments with reference to the drawings.

DETAILED DESCRIPTION OF THE PREFERRED EMBODIMENTS

Figure 1:
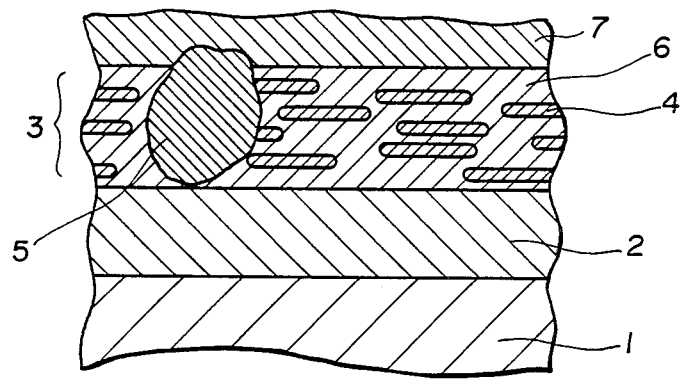
FIG. 1 is a schematic sectional view of a conventional magnetic disk.
Figure 2:
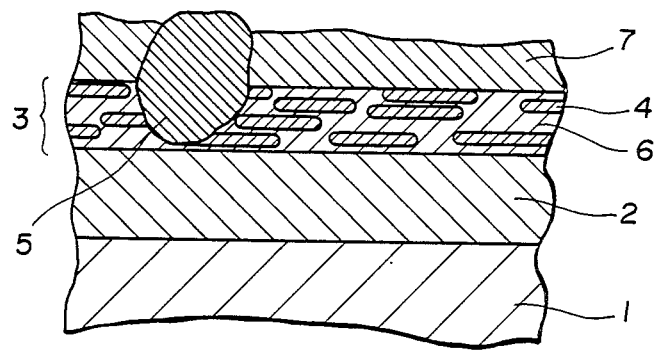
FIG. 2 is also a schematic sectional view of a conventional magnetic disk.
Figure 3:
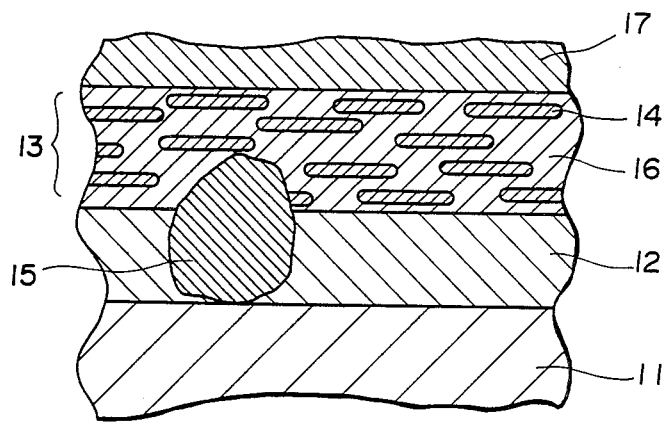
FIG. 3 is a schematic sectional view of an embodiment of the magnetic disk according to the present invention.

FIG. 3 shows a first embodiment of the magnetic disk according to the present invention. The magnetic disk shown in FIG. 3 is formed through the following steps. First, fillers 15 are uniformly diffused into a resin solution by using a ball mill or the like. Next, the resin solution containing the fillers 15 are applied onto a substrate 11 to a predetermined thickness by the spin coating method or the like and thus a resin layer 12 is formed on the substrate 11. According to this embodiment, the thickness of the resin layer 12 is set somewhat smaller than the particle size of the filler 15. After the resin solution is applied, the substrate 11 is dried or heated with the result that the resin layer 12 is set or hardened.

Further, magnetic powder 14 is uniformly diffused into a thermosetting resin solution by using a ball mill or the like. This thermosetting resin solution is hardened to form a binder 16. Next, the thermosetting resin solution is applied onto the resin layer 12 by the spin coating method or the like. After the thermosetting resin is applied, the substrate 11 is dried or heated again with the result that a magnetic film 12 is formed. According to this embodiment, the filler 15 is protruded from the surface of the resin layer 12 into the magnetic film 13. Then a lubricant 17 is applied onto the magnetic film 14. Here the process of magnetic disk manufacture is complete.

An aluminum substrate, glass substrate or resin substrate may be used as the substrate 11. Also an epoxy resin and acetal resin such as polyvinyl butyral (PVB) or the like may be used as the resin layer. A magnetic iron oxide, barium ferrite or the like may be used as the magnetic powder. Powder of single-crystal alumina and diamond, powder of silicon carbide, powder of zirconium oxide (zirconia), powder of titanium carbide or the like may be used as the filters 15. Also an epoxy resin, acetal resin, phenolic resin or amide resin may be used as the thermosetting resin 16.

The lubricant 17 may be a combination of a type applied to the surface of the magnetic film 13 and a type penetrated into the magnetic film 13, or only the type penetrated into the magnetic film 12 may be used.

The magetic disk shown in FIG. 3 has no fillers 15 protruding from the surface of the magnetic film 13. Therefore, since the fillers 15 will not easily cause any noise, the signal-to-noise ratio of reproduced signal is not so much deteriorated and the electromagnetic conversion characteristic of the magnetic disk is improved. Also, since no fillers 15 are protruded from the surface of the magnetic film 13, the magnetic head can be maintained in a good floating posture.

According to the present invention, it is possible to freely adjust the distance from the boundary between the resin layer and magnetic film to the filler top and the distance from the surface of the magnetic film to the top of the filler in the magnetic film by appropriately selecting the particle size of the fillers 15 and thickness of the magnetic film, and the thickness of the resin layer.

Figure 4:
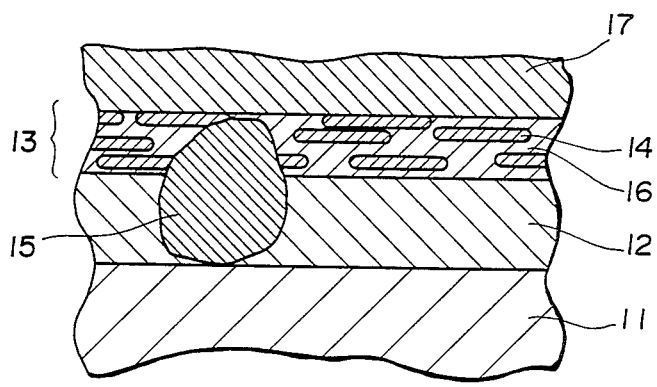
FIG. 4 is also a schematic sectional view of another embodiment of the magnetic disk according to the present invention.
Figure 5:
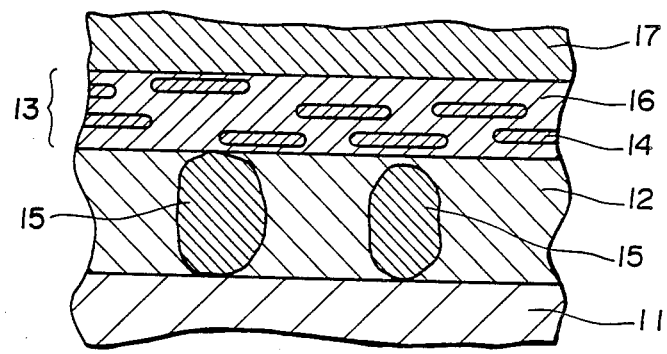
FIG. 5 is a schematic sectional view of still another embodiment of the magnetic disk according to the present invention.
Figure 6:
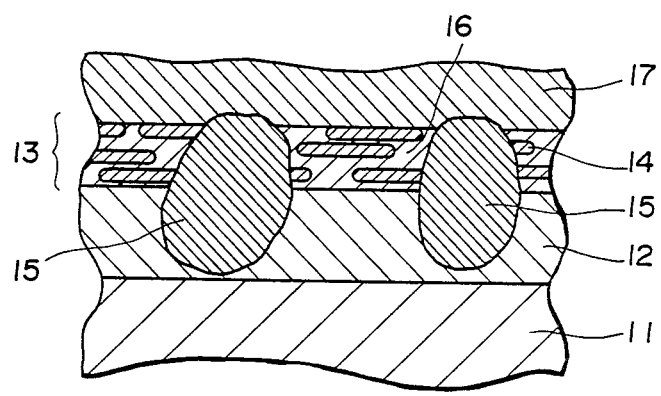
FIG. 6 is a schematic sectional view of yet another embodiment of the magnetic disk according to the present invention.

The magnetic disks shown in FIGS. 4 to 6 are the embodiments manufactured by appropriately selecting the particle size of the fillers 15 and thickness of the magnetic film 13, and the thickness of the resin layer 12.

FIG. 4 shows another embodiment of the magnetic disk according to the present invention. In FIG. 4, the same portions as those in the magnetic disk shown in FIG. 3 are indicated with the same reference numerals as those in FIG. 3. Also the method of manufacturing the magnetic disk shown in FIG. 4 is similar to that shown in FIG. 3. The magnetic disk shown in FIG. 4 has the magnetic film 13 of which the thickness is reduced. So the filler 15 is located near the surface of the magnetic film 13. According to the embodiment shown in FIG. 4, it is possible to provide a magnetic disk of which the magnetic film 13 is reduced in thickness without the fillers 15 being protruded. Therefore, since the fillers 15 do not cause any noise, the signal-to-noise ratio of reproduced signal is not deteriorated and the electromagnetic conversion characteristic of the magnetic disk is improved. Also, since no fillers 15 are protruded from the surface of the magnetic film 13, the magnetic head can be held in a good floating posture. Furthermore in the embodiment of magnetic disk shown in FIG. 4, it is possible to freely control the height of the filler 15 protruding into the magnetic film 13 by adjusting the thickness of the resin layer 12. For example, by increasing the thickness of the resin layer 12, it is possible to reduce the protruded height of the filler 15 into the magnetic film 13.

FIG. 5 shows a third embodiment of the magnetic disk according to the present invention. In FIG. 5, the same portions as those in FIG. 3 are indicated with the same reference numerals as those in FIG. 3. The method of manufacturing the manegtic disk shown in FIG. 5 is similar to that shown in FIG. 3. The magnetic disk shown in FIG. 5 has the resin layer 12 of which the thickness is increased so that the fillers 15 do not protrude from the resin layer 12 into the magnetic film 13.

FIG. 6 shows still another embodiment of the magnetic disk according to the present invention. In FIG. 6, the same portions as those in FIG. 3 are indicated with the same reference numerals as in FIG. 3. The method of manufacturing the magnetic disk shown in FIG. 6 is similar to that shown in FIG. 3. The magnetic disk shown in FIG. 6 has fillers 15 of which the particle size is large so that the filler 15 is protruded from the magnetic film 13.

As apparent from the foregoing, the present invention permits an easy adjustment of the distance from the boundary between the resin layer and magnetic film to the filler top and to design the magnetic disk with an improved freedom.

What is claimed is:

1. A method for manufacturing a magnetic disk, comprising the following steps:
    applying a first resin solution containing filler particles onto a substrate and then hardening the first resin solution to form a resin layer having a thickness smaller than any filler particle size; and
    applying a second resin solution containing a magnetic powder onto the resin layer and then hardening the second solution to form a magnetic film layer.

2. A method for manufacturing a disk, according to claim 1, where said filler particles are selected to have substantially the same size.

3. A method for manufacturing a magnetic disk, according to claim 2, wherein filler particle sizes are selected so as to achieve a predetermined spacing between a surface of the resin layer and a top of each filler particle.

4. A method for manufacturing a magnetic disk, according to claim 3, wherein said filler particles protrude from the surface of the resin layer, and each top of said filler particles is existent in said magnetic film layer.

5. A method for manufacturing a magnetic disk, according to claim 3, wherein each top of said filler particles protrudes from a surface of said magnetic film layer.

6. A method for manufacturing a magnetic disk, according to claim 2, wherein a thickness of said first resin solution is selected so as to achieve a predetermined spacing between a surface of the resin layer and a top of each filler particle.

7. A method for manufacturing a magnetic disk, according to claim 6, wherein said filler particles protrude from the surface of the resin layer, and each top of said filler particles is existent in said magnetic film layer.

8. A method for manufacturing a magnetic disk, according to claim 6, wherein each top of said filler particles protrudes from a surface of said magnetic film layer.

9. A method for manufacturing a magnetic disk, according to claim 2, wherein a thickness of said second resin solution is selected so as to achieve a predetermined spacing between a surface of the magnetic film layer and a top of each filler particle.

10. A method for manufacturing a magnetic disk, according to claim 9, wherein said filler particles protrude from the surface of the resin layer, and each top of said filler particles is existent in said magnetic film layer.

11. A method for manufacturing a magnetic disk, according to claim 9, wherein each top of said filler particles protrudes from a surface of said magnetic film layer.

12. A method for manufacturing a magnetic disk according to claim 2, wherein said filler particle size and a thickness of said first resin solution are selected so as to achieve a predetermined spacing between a surface of the resin layer and a top of each filler particle.

13. A method for manufacturing a magnetic disk, according to claim 12, wherein said filler particles protrude from the surface of the resin layer, and each top of said filler particles is existent in said magnetic film layer.

14. A method for manufacturing a magnetic disk, according to claim 12, wherein each top of said filler particles protrudes from a surface of said magnetic film layer.

15. A method for manufacturing a magnetic disk, according to claim 2, wherein said filler particle size, and a thickness of said first resin solution and a thickness of a second resin solution are selected so as to achieve a predetermined spacing between a surface of the magnetic film layer and a top of each filler particle.

16. A method for manufacturing a magnetic disk, according to claim 15, wherein said filler particles protrude from the surface of the resin layer, and each top of said filler particles is existent in said magnetic film layer.

17. A method for manufacturing a magnetic disk, according to claim 15, wherein each top of said filler particles protrudes from a surface of said magnetic film layer.

18. A magnetic disk manufactured by the method of claim 1.

19. A magnetic disk manufactured by the method of claim 2.

20. A magnetic disk manufactured by the method of claim 3.

21. A magnetic disk manufactured by the method of claim 4.

22. A magnetic disk manufactured by the method of claim 5.

23. A magnetic disk manufactured by the method of claim 6.

24. A magnetic disk manufactured by the method of claim 7.

25. A magnetic disk manufactured by the method of claim 8.

26. A magnetic disk manufactured by the method of claim 9.

27. A magnetic disk manufactured by the method of claim 10.

28. A magnetic disk manufactured by the method of claim 11.

29. A magnetic disk manufactured by the method of claim 12.

30. A magnetic disk manufactured by the method of claim 13.

31. A magnetic disk manufactured by the method of claim 14.

32. A magnetic disk manufactured by the method of claim 15.

33. A magnetic disk manufactured by the method of claim 16.

34. A magnetic disk manufactured by the method of claim 17.

35. A magnetic disk, comprising a substrate, a resin layer formed on said substrate, a magnetic film layer containing magnetic powders formed on said resin layer, and filler particles, a part of each filler particle being fixed in said resin layer and a remainder part of each filler particle protruding from a surface of said resin layer into said magnetic film layer.

36. A magnetic disk comprising a substrate, a resin layer formed on said substrate, a magnetic layer containing magnetic powders formed on said resin layer, and filler particles, a part of each filler particle being fixed in said resin layer and a remainder part of each filler particle protruding from a surface of said resin layer, penetrating the magnetic film layer.

* * * * *